(No Model.)

G. W. BENNUM.
EYEGLASSES.

No. 524,698. Patented Aug. 21, 1894.

Witnesses
Wm. H. Heiden.
Van Buren Hillyard.

Inventor
George W. Bennum
By Attorney
George W. Bennum

UNITED STATES PATENT OFFICE.

GEORGE W. BENNUM, OF GEORGETOWN, DELAWARE.

EYEGLASSES.

SPECIFICATION forming part of Letters Patent No. 524,698, dated August 21, 1894.

Application filed September 8, 1893. Serial No. 485,090. (No model.)

*To all whom it may concern:*

Be it known that I, GEORGE W. BENNUM, a citizen of the United States, residing at Georgetown, in the county of Sussex, State of Delaware, have invented certain new and useful Improvements in Eyeglasses; and I do hereby declare the following to be a full, clear, and exact description of the invention, such as will enable others skilled in the art to which it appertains to make and use the same.

My invention relates to improvements in eye-glasses and its object is to provide an improved construction of the same which shall possess superior advantages with respect to efficiency in operation.

The invention consists in the novel construction and combination of parts hereinafter fully described and claimed.

Figure 1:
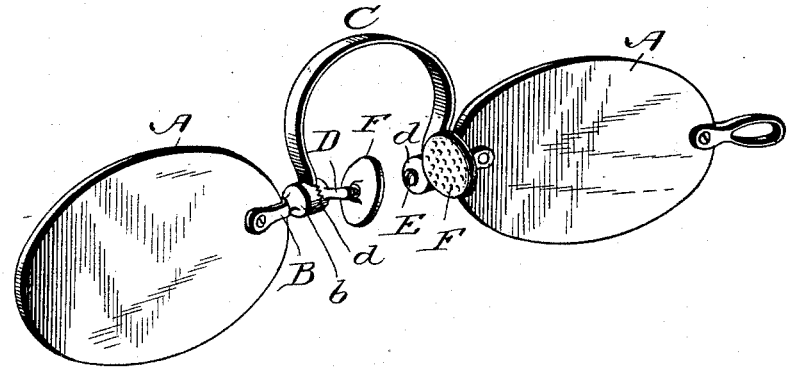
Figure 2:
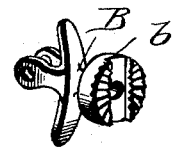
Figure 3:
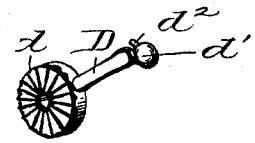
Figure 4:
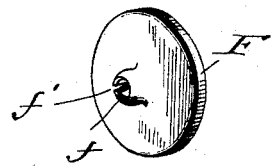
Figure 5:
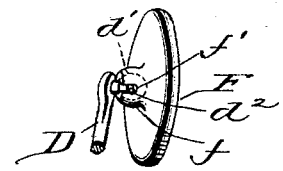

Figure 1 is a perspective view of a pair of eye glasses embodying the invention. Fig. 2 is a detail view of a stud to which the arm carrying the plate or disk is adjustably connected. Fig. 3 is a detail view of the adjustable arm. Fig. 4 is a detail view of the plate or disk showing the socket on the rear side thereof. Fig. 5 is a detail view showing the ball and socket connections between the plate or disk and its carried arm, showing the manner of preventing the said plate or disk rotating or turning on the said arm.

The eye glasses may be of any desired form of construction and comprise the eye pieces A, the studs B, and the bridge or bow spring C connecting the said eye pieces. The studs B may be attached to the eye pieces in any of the well known ways, either to the rims where the said eye pieces are so protected, or directly to the eye pieces themselves as shown in the accompanying drawings. The studs are provided on their outer ends with heads $b$ to receive corresponding heads on the inner ends of the arms D. These arms D are connected to the studs B so as to turn to make provision for changing the pitch or position of the eye pieces. Binding screws E pass through the heads $d$ and $b$ and screw into the latter and serve as means to secure the arms in place. These arms D turn on the binding screws as an axis. To prevent the accidental displacement of the said arms after being properly adjusted the opposing or meeting faces of the heads $b$ and $d$ are serrated or roughened to obtain positive engagement between them when the binding screws are turned home. Obviously, to change the relative position of the arms D the binding screws E are loosened sufficiently to permit the turning of the said arms into the required position. After the arms are properly adjusted the said binding screws are tightened and fix the said arms in the adjusted position.

The plates or disks F are connected with the outer ends of the arms D by a ball and socket joint, suitable means being provided to prevent the said plates or disks from turning whereby the relative pitch or set of the glasses is preserved. The outer ends of the arms D have balls $d'$ and the rear sides of the plates or disks F have corresponding sockets $f$ to receive the said balls, the socket being provided in any of the usual ways by crimping, spinning or swaging.

A notch or slot $f'$ is provided in the side of the sockets $f$ to receive a pin or projection $d^2$ on the balls and serve as a means to prevent the said plates or disks from turning. By this construction the disks will readily adapt themselves to the shape of the nose and will be firmly held thereon without discomfort to the wearer.

The ends of the bridge or bow spring C are seated in recesses provided in one or the other of the heads $b$ and $d$, the said recesses being provided in the heads $d$, as shown. The binding screws pass through openings in the ends of the said bridge or bow spring and hold the latter in place, hence, it will be seen that the binding screws serve a two fold purpose that of securing the bridge or bow spring in place as well as the arms D. The kind of material composing the said plates or disks is not essential and may be of metal or other material suitable for the purpose. The said plates or disks may be roughened or left smooth, or they may be faced with any suitable material, which may be made smooth or rough to suit the caprice of the maker and the wearer.

Having thus described my invention, what

I claim, and desire to secure by Letters Patent, is—

1. In a pair of eye glasses, the combination with the studs secured to the eye pieces, of the plates or disks having sockets formed with notches, the balls seated in said sockets and provided with pins engaging with said notches and the arms formed with said balls and connected with said studs substantially as described.

2. The combination in a pair of eye glasses of the studs connected with the eye pieces, of the rotatable arms connected with said studs and formed with balls on their inner ends provided with pins, the plates or disks having sockets in which said balls are seated and provided with notches with which said pins engage, substantially as described.

In testimony whereof I affix my signature in presence of two witnesses.

GEORGE W. BENNUM.

Witnesses:
GEORGE E. MESSICK,
JOHN J. MORRIS, Jr.